(12) United States Patent
Cho et al.

(10) Patent No.: US 8,798,831 B2
(45) Date of Patent: Aug. 5, 2014

(54) DEVICE AND METHOD FOR CALCULATING DISTANCE TO EMPTY OF ELECTRIC VEHICLE

(75) Inventors: Il Cho, Incheon (KR); Ki Taek Sung, Gyeonggi-do (KR); Woo Sung Kim, Gyeonggi-do (KR); Do Sung Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 171 days.

(21) Appl. No.: 13/098,687

(22) Filed: May 2, 2011

(65) Prior Publication Data
US 2012/0143413 A1 Jun. 7, 2012

(30) Foreign Application Priority Data
Dec. 3, 2010 (KR) .................. 10-2010-0122440

(51) Int. Cl.
*B60L 15/20* (2006.01)

(52) U.S. Cl.
USPC ........ 701/22; 903/903; 180/65.21; 180/65.29

(58) Field of Classification Search
None
See application file for complete search history.

(56) References Cited

U.S. PATENT DOCUMENTS

| | | | | |
|---|---|---|---|---|
| 3,908,451 A * | 9/1975 | Walker et al. | ............... | 73/114.53 |
| 5,479,085 A * | 12/1995 | Honda et al. | .................. | 320/134 |
| 5,623,194 A * | 4/1997 | Boll et al. | ...................... | 320/137 |
| 5,650,931 A * | 7/1997 | Nii | ................... | 701/22 |
| 5,734,099 A * | 3/1998 | Saigo et al. | ................ | 73/114.58 |
| 5,892,346 A * | 4/1999 | Moroto et al. | ................ | 318/587 |
| 5,908,463 A * | 6/1999 | Akazaki et al. | ............... | 701/104 |
| 5,916,298 A * | 6/1999 | Kroiss et al. | .................. | 701/123 |
| 6,160,380 A * | 12/2000 | Tsuji et al. | ..................... | 320/132 |
| 6,201,312 B1 * | 3/2001 | Shioiri et al. | ............... | 290/40 C |
| 7,299,114 B2 * | 11/2007 | Angenendt et al. | ............. | 701/21 |
| 8,509,968 B1 * | 8/2013 | Saccone et al. | .................... | 701/3 |
| 2002/0188387 A1 * | 12/2002 | Woestman et al. | ............. | 701/22 |
| 2003/0015874 A1 * | 1/2003 | Abe et al. | .................... | 290/40 C |
| 2004/0204797 A1 * | 10/2004 | Vickers | ............................ | 701/1 |
| 2006/0202663 A1 * | 9/2006 | Cho et al. | ....................... | 320/132 |
| 2006/0276937 A1 * | 12/2006 | Yamashita | .................... | 700/291 |
| 2007/0029121 A1 * | 2/2007 | Saitou et al. | ................. | 180/65.2 |
| 2007/0159137 A1 * | 7/2007 | Verbrugge et al. | ............ | 320/132 |
| 2007/0247291 A1 * | 10/2007 | Masuda et al. | ................ | 340/439 |
| 2008/0319597 A1 * | 12/2008 | Yamada | .......................... | 701/22 |

(Continued)

FOREIGN PATENT DOCUMENTS

| | | |
|---|---|---|
| KR | 10-0254426 B1 | 2/2000 |
| KR | 10-2002-0003764 | 1/2002 |
| KR | 10-0828796 B1 | 5/2008 |

*Primary Examiner* — Fadey Jabr
*Assistant Examiner* — Krishnan Ramesh
(74) *Attorney, Agent, or Firm* — Edwards Wildman Palmer LLP; Peter F. Corless

(57) ABSTRACT

The prevent invention provides a device and a method for calculating a distance to empty of an electric vehicle which can reduce an initial error in estimating a distance to empty of an electric vehicle. The device and the method for calculating a distance to empty of an electric vehicle can provide more accurate DTE information from the start to the end of traveling by reducing the earlier error, in estimating the DTE from the amount of the presently remaining fuel (the amount of remaining capacity of a battery) of the electric vehicle.

7 Claims, 1 Drawing Sheet

(56) References Cited

U.S. PATENT DOCUMENTS

| | | | |
|---|---|---|---|
| 2009/0157244 A1* | 6/2009 | Kim | 701/22 |
| 2009/0277701 A1* | 11/2009 | Soma et al. | 180/65.25 |
| 2011/0046834 A1* | 2/2011 | Grider et al. | 701/22 |
| 2011/0166810 A1* | 7/2011 | Grider et al. | 702/63 |
| 2011/0172864 A1* | 7/2011 | Syed et al. | 701/22 |
| 2012/0143413 A1* | 6/2012 | Cho et al. | 701/22 |
| 2012/0143435 A1* | 6/2012 | Cho et al. | 701/33.4 |
| 2013/0073113 A1* | 3/2013 | Wang et al. | 701/1 |

* cited by examiner

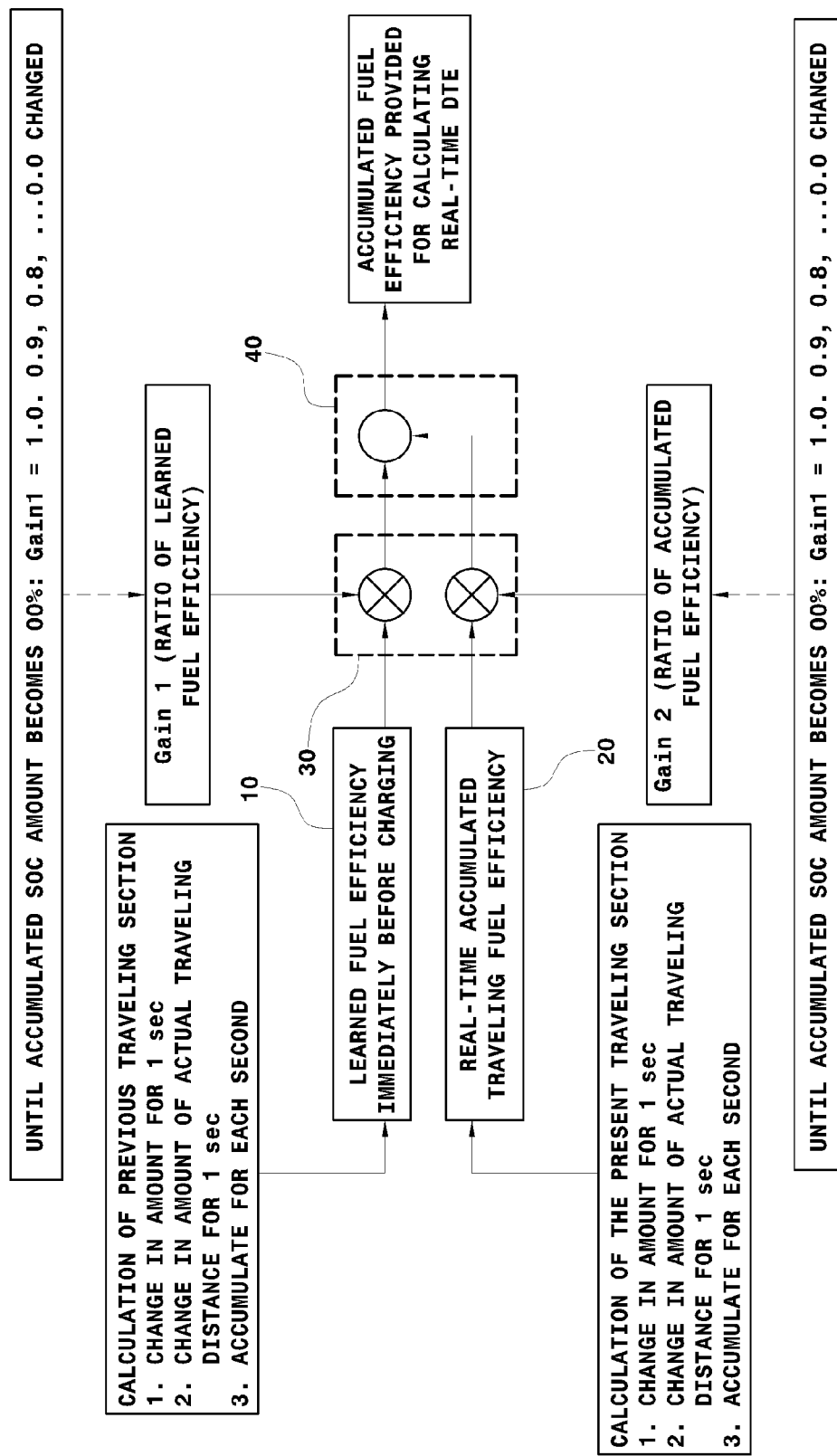

DEVICE AND METHOD FOR CALCULATING DISTANCE TO EMPTY OF ELECTRIC VEHICLE

CROSS-REFERENCE TO RELATED APPLICATION

This application claims under 35 U.S.C. §119(a) the benefit of Korean Patent Application No. 10-2010-0122440 filed Dec. 3, 2010, the entire contents of which are incorporated herein by reference.

BACKGROUND (a) Technical Field

The present invention relates to a device and a method for calculating a distance to empty of an electric vehicle. More particularly, it relates to a device and a method for calculating a distance to empty of an electric vehicle capable of reducing an initial error in estimating a distance to empty of an electric vehicle.

(b) Background Art

The distance that can be traveled by a vehicle with the amount of the presently remaining fuel (e.g., the amount of gasoline, diesel, and LPG) is called a DTE (Distance To Empty).

The DTE provides important traveling information which provides convenience for drivers. The DTE is usually displayed on a trip computer included in many vehicles.

The DTE is very important information particularly for the drivers of electric vehicles. The batteries which operate these vehicles cannot be easily charged, and, thus, the DTE is one factor that requires accuracy.

Therefore, it is very crucial to reduce an early estimation error so as to improve accuracy of the DTE information.

The DTE varies greatly according to the driver's driving style, which cannot be measured but can only be estimated. The DTE of electric vehicles is the amount of electricity, i.e., the remaining capacity of a battery, unlike general vehicles (i.e. motor vehicles powered by fuel).

Therefore, there is a need for the development of a technology for estimating the remaining capacity of a battery to accurately estimate the DTE of electric vehicles, along with the development for a method of accurately estimating DTE.

Accumulated fuel efficiency (km/SOC hereinafter) for taking into consideration the driving inclination or style (e.g. speed, acceleration, deceleration, etc.) of a driver is measured to estimate the DTE. The accuracy of the accumulated fuel efficiency may be improved with the increase in the accumulation time, as the term hints. That is, it is possible to more accurately account for the driving inclination or style of a driver over time.

Unlike general vehicles, significant errors in the accumulated fuel efficiency are normally generated at an earlier traveling period of electric vehicles. In the case of general vehicles, it is easy to overcome these errors by use of various combinations of officially acknowledged fuel efficiency data and accumulated fuel efficiency. However, similar data and techniques have not been provided for electric vehicles, and thus the errors in the DTE information, particularly at earlier traveling periods, still remains to be solved.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a device and a method for calculating a distance to empty of an electric vehicle which can provide more accurate DTE information. In particular, the present invention provides a device and method which provides more accurate DTE information from the start to the end of traveling by reducing the earlier error (i.e. error occurring at the start of travel), in estimating the DTE from the amount of the presently remaining fuel (the amount of remaining capacity of a battery) of an electric vehicle.

In one aspect, the present invention provides a device for calculating a distance to empty of an electric vehicle, including: a calculation unit of learned fuel efficiency before charging (e.g. in some embodiments immediately before charging); a calculation unit of real-time accumulated traveling fuel efficiency; a measurement unit of accumulated fuel efficiency which measures accumulated fuel efficiency by relatively combining the learned fuel efficiency and the real-time accumulated fuel efficiency as a ratio of the learned fuel efficiency before charging to the real-time accumulated traveling fuel efficiency based on an SOC of a battery; and an output unit of accumulated fuel efficiency which outputs the accumulated fuel efficiency measured by the measurement unit of accumulated fuel efficiency to calculate the distance to empty.

In another aspect, the present invention provides a method for calculating a distance to empty of an electric vehicle, including: calculating learned fuel efficiency before charging; calculating real-time accumulated traveling fuel efficiency; combining the learned fuel efficiency and real-time accumulated traveling fuel efficiency as a ratio between the learned fuel efficiency before charging (preferably immediately before charging) and the real-time accumulated traveling fuel efficiency, based on an SOC of a battery; and outputting the accumulated fuel efficiency measured by the combination of the relative ratio between the learned fuel efficiency before charging and the real-time accumulated traveling fuel efficiency in order to calculate the distance to empty. According to the present invention, it is possible to significantly reduce and nearly eliminate a difference and an error between a previous traveling pattern and the present traveling pattern, by using an accumulated fuel efficiency which is obtained by combining a relative ratio between learned fuel efficiency before traveling (preferably immediately before traveling) and present-traveling real-time accumulated fuel efficiency, in order to calculate a distance to empty.

In estimating the distance to empty of an electric vehicle, as described above, it is possible to improve accuracy in estimating the distance to empty by taking into consideration the driver's driving style or inclination in real time from a prior period of travel, in addition to the latter traveling. As such, it is possible to provide drivers with more accurate information regarding electric vehicles which operate using batteries that cannot be easily charged.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein:

FIG. 1 is a control block diagram illustrating a device and a method for calculating a distance to empty of an electric vehicle according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, preferred embodiments of the present invention will be described in detail with reference to the accompanying drawings.

As described above, in estimating a DTE (Distance To Empty) of an electric vehicle by learning (checking) in real time the driver's driving style or inclination from accumulated fuel efficiency, although the accuracy in estimating the DTE may be improved with the increase of the accumulated fuel efficiency data (km/SOC hereinafter), data of the accumulated fuel efficiency is insufficient particularly in the earlier traveling periods (e.g. where there is little to no accumulated fuel efficiency information), such that a large error is generated in estimating the DTE. It should be implied that the above and below processes are executed by a DTE computer that includes a memory that stores the below and above processes as program instructions and a processor that executes said instructions. As such the DTE computer is defined by the processes it is configured to execute.

In order to overcome this problem, the present invention provides a device and method that calculates accumulated fuel efficiency from an initially used specific accumulated SOC and a traveling distance based on the SOC, and relatively changing a ratio of the previous learned accumulated fuel efficiency for the previous period and the real-time accumulated fuel efficiency. The present invention, thus, significantly and even maximally reduces a difference and an error between the previous traveling pattern and a present traveling pattern For this purpose, the present invention provides a device for calculating a distance to empty of an electric vehicle that, according to an embodiment of the present invention as shown in FIG. 1, includes a calculation unit of learned fuel efficiency immediately before charging 10 which calculates learned efficiency immediately before the electric vehicle travels, particularly before travel and before the battery is charged, a calculation unit of real-time accumulated traveling fuel efficiency 20 which calculates accumulated fuel efficiency of an electric vehicle that is traveling, a measurement unit of accumulated fuel efficiency 30 which measures the final accumulated fuel efficiency while relatively changing the ratio of the learned fuel efficiency immediately before charging and the real-time accumulated traveling fuel efficiency, and an output unit of accumulated fuel efficiency 40 which outputs the final accumulated fuel efficiency measured by the measurement unit of accumulated fuel efficiency 30 to calculate the DTE.

A method for calculating a DTE of an electric vehicle of the present invention, based on the above configuration, is described hereafter.

First, the calculation unit of learned fuel efficiency immediately before charging 10 calculates learned fuel efficiency immediately before charging, and simultaneously, a calculation unit of real-time accumulated traveling fuel efficiency 20 calculates the real-time accumulated traveling fuel efficiency.

In this process, the learned fuel efficiency immediately before charging and the real-time accumulated traveling fuel efficiency are calculated using the same method, in which the CHANGE IN AMOUNT of SOC of a battery per second and the CHANGE IN AMOUNT of an ACTUAL TRAVELING DISTANCE per second are cumulatively calculated for each second (or other suitable period of time).

Since the learned fuel efficiency immediately before charging and the real-time accumulated traveling fuel efficiency are calculated using the same method, they may be the same value. However, the learned fuel efficiency immediately before charging and the real-time accumulated traveling fuel efficiency may be different in accordance with the driving inclination or style of a driver in an earlier traveling period. As such, it is possible to significantly reduce, in some cases to the greatest possible extent, a difference and an error between the previous initial traveling pattern and the present initial traveling pattern, by combining the learned fuel efficiency that has been learned in the previous earlier traveling period and the accumulated fuel efficiency accumulated in present traveling.

Therefore, the final accumulated fuel efficiency is calculated by relatively combining the ratio between the learned fuel efficiency immediately before charging and the real-time accumulated traveling fuel efficiency, based on the SOC of a battery.

The final accumulated fuel efficiency can be calculated by changing the relative ratio between the learned fuel efficiency immediately before charging (which has been calculated by the calculation unit of learned fuel efficiency immediately before charging 10) and the real-time accumulated traveling fuel efficiency (which has been calculated by the calculation unit of real-time accumulated traveling fuel efficiency 20) every time the SOC of a battery changes by a particular amount, and in particular by about 1%, for a predetermined period. In accordance with various embodiments, the calculation is carried out, preferably, until the SOC of the battery is consumed by about 10% in traveling.

In particular, according to this embodiment the final accumulated fuel efficiency is calculated by combining the relative ratio between the accumulated fuel efficiency immediately before charging and the real-time accumulated traveling fuel efficiency to 9:1, 8:2, 7:3, 6:4, 5:5, 4:6, 3:7, 2:8, 1:9, and 0:10, every time the SOC of a battery changes by 1%.

The final accumulated fuel efficiency calculated from the measurement unit of accumulated fuel efficiency 30 is outputted through the output unit of accumulated fuel efficiency 40 in order to calculate the earlier-traveling DTE of the electric vehicle. The outputted final fuel efficiency is then inputted to a common logic unit for use in calculating the initial DTE to be used to accurately calculate the real-time DTE.

Meanwhile, in various embodiments, since the accuracy is improved with the increase of accumulated fuel efficiency data after a predetermined period (e.g. when the SOC of a battery has been consumed by 10% in traveling), the measurement unit of accumulated fuel efficiency 30 does not combine the learned accumulated fuel efficiency (i.e. efficiency immediately before charging) with the real-time accumulated traveling fuel efficiency. Thus, after a predetermined period (e.g. when the SOC of a battery has been consumed by 10% in traveling), only the real-time accumulated traveling fuel efficiency is transmitted to the output unit of accumulated fuel efficiency 40, such that only the real-time accumulated traveling fuel efficiency is used to calculate the DTE.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A computer, comprising:
    a memory configured to store one or more program instructions; and
    a processor configured to execute the one or more program instructions stored on the memory, wherein the one or more program instructions are configured to:
        calculate a learned fuel efficiency before an electric vehicle travels or a battery is charged;
        calculate the real-time accumulated traveling fuel efficiency;
        apply a first gain to the learned fuel efficiency and a second gain to the real-time accumulated traveling fuel efficiency, the first gain and the second gain changing over time based on a state of charge (SOC) of the battery; and
        output a distance to empty by adding the learned fuel efficiency with the first gain applied and the real-time accumulated traveling fuel efficiency with the second gain applied together, wherein a result of combining the first and second gains is 1 in such a manner that the first gain decreases every time the SOC of the battery changes by 1%.

2. A method for calculating a distance to empty of an electric vehicle, comprising:
    calculating, by a computer, a learned fuel efficiency before an electric vehicle travels or a battery is charged;
    calculating, by the computer, real-time accumulated traveling fuel efficiency;
    applying, by the computer, a first gain to the learned fuel efficiency and a second gain to the real-time accumulated traveling fuel efficiency, the first gain and the second gain changing over time based on a state of charge (SOC) of the battery; and
    outputting, by the computer, a distance to empty by combining the learned fuel efficiency with the first gain applied and the real-time accumulated traveling fuel efficiency with the second gain applied together, wherein a result of combining the first and second gains is 1 in such a manner that the first gain decreases every time the SOC of the battery changes by 1%.

3. The method for calculating a distance to empty of an electric vehicle of claim 2, wherein a learned fuel efficiency before charging and the real-time accumulated traveling fuel efficiency are calculated by measuring and collecting a change in amount of SOC of the battery per second and a change in amount of an actual traveling distance per second, for each second.

4. The method for calculating a distance to empty of an electric vehicle of claim 2, wherein the first gain of the learned fuel efficiency and the second gain of the real-time accumulated traveling fuel efficiency changes every time the SOC of the battery changes by 1%.

5. The method for calculating a distance to empty of an electric vehicle of claim 1 or 4, wherein a ratio of the learned fuel efficiency to the real-time accumulated traveling fuel efficiency resulting from the applications of the first gain and the second gain is 9:1 at 99% SOC, 8:2 at 98% SOC, 7:3 at 97% SOC, 6:4 at 96% SOC, 5:5 at 95% SOC, 4:6 at 94% SOC, 3:7 at 93% SOC, 2:8 at 92% SOC, 1:9 at 91% SOC, and 0:10 at 90% SOC.

6. The method for calculating a distance to empty of an electric vehicle of claim 2, wherein only the real-time accumulated traveling fuel efficiency is calculated after a predetermined period, to thereby calculate the distance to empty.

7. The method for calculating a distance to empty of an electric vehicle of claim 6, wherein the predetermined period is a period where the SOC of the battery is consumed by 10%.

* * * * *